J. R. SNYDER.
LOAD CONTROLLED AIR BRAKE.
APPLICATION FILED JAN. 15, 1912.
1,091,596.   Patented Mar. 31, 1914.
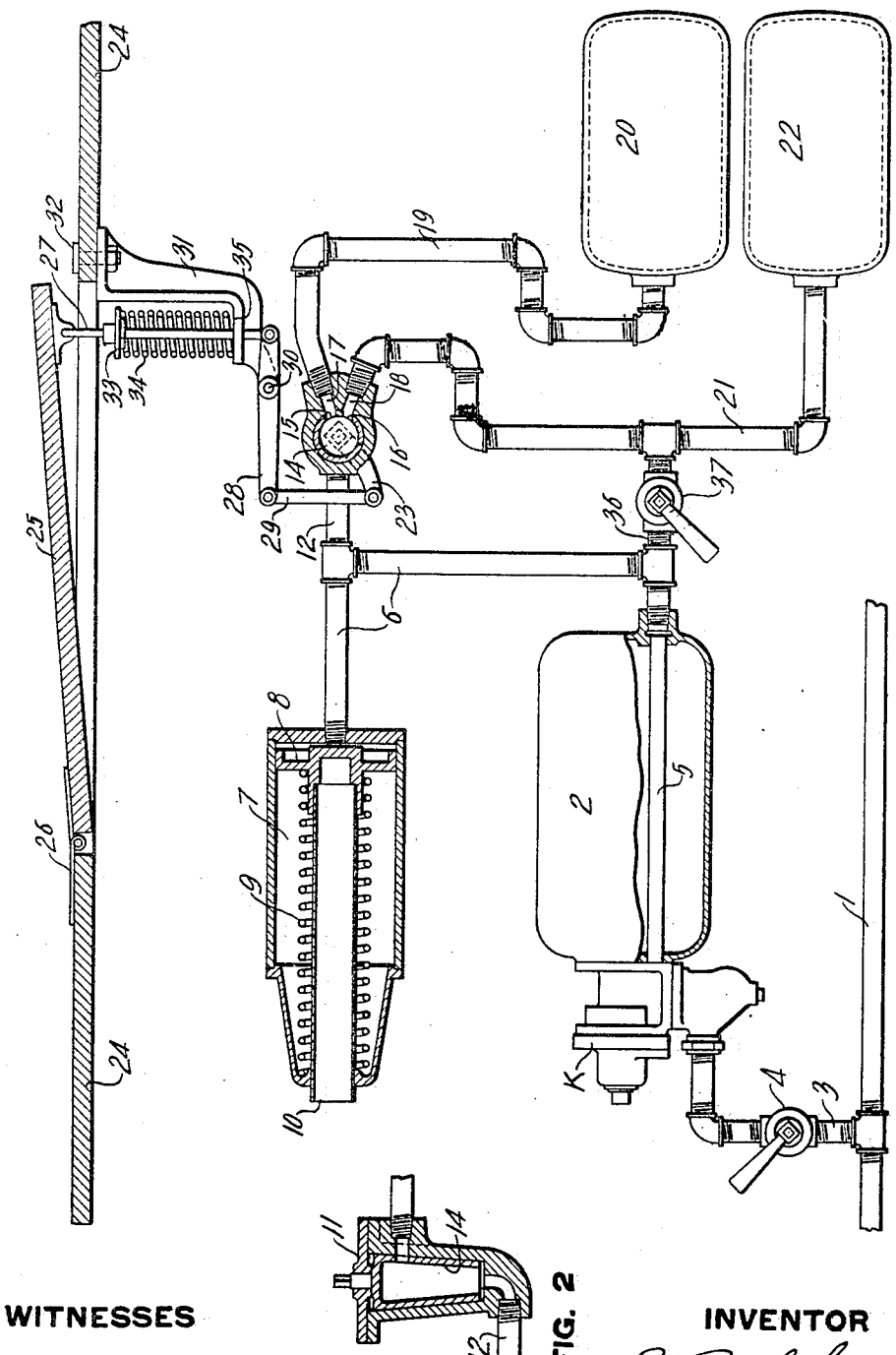
WITNESSES   INVENTOR

UNITED STATES PATENT OFFICE.

JACOB RUSH SNYDER, OF PITTSBURGH, PENNSYLVANIA, ASSIGNOR TO PERCY E. DONNER, OF ALLEGHENY COUNTY, PENNSYLVANIA.

LOAD-CONTROLLED AIR-BRAKE.

1,091,596.  Specification of Letters Patent.  Patented Mar. 31, 1914.

Application filed January 15, 1912. Serial No. 671,237.

*To all whom it may concern:*

Be it known that I, JACOB RUSH SNYDER, a citizen of the United States, residing at Pittsburgh, in the county of Allegheny and State of Pennsylvania, have invented certain new and useful Improvements in Load-Controlled Air-Brakes, of which the following is a specification.

The object of the invention is to provide an arrangement whereby the force or intensity with which the brakes are applied to the several cars in the train varies according to the loads of the cars, so that in a mixed train of loaded and unloaded cars the braking effect on each car is proportioned, at least roughly, to its weight, whereby each car will be braked substantially to the maximum possible without locking the wheels and causing them to slide.

In railway practice the braking force or pressure is based at about 70 per cent. of the light weight of a car, which in case of modern light weight heavy capacity cars means only about 20 per cent. of their loaded weight. Consequently, the proper proportionate amount of braking is not done on loaded cars equipped with the usual standard air brake apparatus. By means of my improvements, however, the braking force or pressure is maintained as to empty cars but is considerably increased as to loaded cars. This result is secured by means of simple apparatus relatively cheap as to first cost and also as to upkeep.

In carrying out the invention the brake cylinder and other parts of the apparatus are made of sufficient size to apply a 70 per cent. braking effect to the fully loaded car, but means are provided for diverting a portion of the air admitted by the triple valve from the auxiliary reservoir to the brake cylinder away from the brake cylinder and into a separate expansion chamber or tank so that the usual amount of air supplied to the brake cylinder upon any application of the brakes expands not only into the brake cylinder but also into this supplementary expansion chamber, whereby the braking pressure is proportionately reduced to produce the proper braking effect upon an empty car; in combination with means for cutting out said expansion chamber more or less with increase in the load of the car.

In the accompanying drawings, Figure 1 is a diagrammatic view partly in section showing the improved air brake mechanism, and Fig. 2 is a longitudinal section through the control valve for the expansion chambers or tanks.

In the drawings, 1 represents the usual train pipe; 2 the auxiliary reservoir; K the triple valve; 3 the pipe connecting the train pipe with the triple valve and provided with the cut-off cock 4; 5 the usual pipe leading from the triple valve to the brake cylinder, in this case by way of pipe 6; 7 the usual brake cylinder provided with piston 8, spring 9 and piston rod 10, from which movement is transmitted to the brake shoes by any of the various forms of brake rigging in common use. All of the parts so far described are or may be of the usual types of mechanism of the kinds mentioned and operate in the well understood manner of operation of automatic air brakes.

In carrying my invention into effect, instead of permitting all of the air admitted by the triple valve K from auxiliary reservoir 2 in service applications, to pass into and expand in the brake cylinder 7, I provide an additional or supplementary expansion chamber into which more or less of said air can expand when the car is light or when partly loaded, said expansion chamber being in effect a blind or blank brake cylinder or cul de sac; simple means being provided for opening more or less of said expansion chamber to the brake cylinder, depending upon the load weight of the car. As illustrated, there are two such expansion chambers or tanks provided, numbered respectively 20 and 22, the former of which is connected by pipe 19 to port 17 and the latter of which is connected by pipe 21 to port 18 of the casing of suitable control valve 11, which casing is also connected by pipe 12 to the brake cylinder. In the control valve casing is a rotary hollow plug 14 provided with a pair of ports 15 and 16 which may be brought into register with the ports 17 and 18.

The rotary valve or plug 14 is provided with a suitable handle 23 by which it may be operated manually if desired, but preferably it will be operated automatically in some way dependent upon whether the car is loaded or light. This may be effected in any of the well understood manners of operating such control valves due to the weight of the car and in the drawings is illustrated as being effected from a portion of the car body against which the load rests.

As illustrated, 24 represents the floor of the car body in which is a door 25 hinged at 26. The door is connected by link or rod 27 to one end of lever 28 fulcrumed at 30 on a bracket 31 secured to the floor of a car by bolts 32, the opposite end of said lever being connected by link 29 to the arm or handle 23. The rod or link 27 is provided with a collar 33 between which and a seat 35 of bracket 31 is interposed a spring 34 which serves to lift the door 25 when no load is in the car. It is obvious that as load is applied to the door 25 it will operate the valve 14 and the connections described to first cut out the expansion tank 20 and upon application of greater load to also cut out the expansion tank 22.

As the door 25 is of limited area it might be loaded locally, as by means of a block of stone of sufficient weight, to fully depress the spring 24 and cut out both expansion tanks 20 and 22 while the car as a whole was not fully loaded. To meet this contingency a connection 36 is provided between the pipes 6 and 21 and provided with a cock 37 by means of which the expansion tank 22 can be thrown into communication with the brake cylinder 7 even though the valve 14 has been previously operated to cut out said expansion tank 22.

When the valve 14 is in the position shown in Fig. 1, both of the expansion tanks 20 and 22 are connected to the brake cylinder so that when air is admitted to the brake cylinder to apply the brakes, this air divides, part going to the brake cylinder and the remainder to the two expansion chambers, thus providing a large space into which the volume of air expands and correspondingly reduces the pressure in the brake cylinder and the resultant braking effect upon the wheels. This is the condition when the car is unloaded. Should the car be partly loaded, the valve 14 is partly turned clockwise, viewing Fig. 1, so as to cut out the expansion chamber 20 but leave the expansion chamber 22 still in communication with the brake cylinder by registration of port 15 with port 18. When now air is admitted by the triple valve from the auxiliary reservoir in applying the brakes, it can expand only into the brake cylinder and into the expansion chamber 22, thereby securing a higher braking pressure than in the case of the empty car. When the car is fully loaded the valve 14 is turned still farther clockwise to cut out both of the expansion chambers 20 and 22 and consequently all the air admitted by the triple valve from the auxiliary reservoir in the application of the brakes, must expand into the brake cylinder, thereby securing a high pressure in said cylinder and a corresponding braking effect.

The air admitted to the expansion chambers 20 and 22 during the application of the brakes when the car is either empty or partly loaded is exhausted from the expansion chambers when the triple valve goes to release position. Consequently, these chambers are, strictly speaking, blank or blind brake cylinders or expansion chambers directly connected with the brake cylinder for receiving a part of the air which otherwise would flow wholly to the brake cylinder, being charged with air and exhausted simultaneously with the charging and exhaustion of the brake cylinder.

It will be understood that the valve 14 can be operated manually if desired by setting it to the proper position by hand according as to whether the car is empty, partly loaded or fully loaded. It is preferred, however, to set this valve into its various adjusted positions automatically by the load in the car.

The apparatus described is simple, inexpensive and reliable. Its first cost is small and it is also very cheap of upkeep as there is little to get out of order. Wide variations in the constructions and arrangements in the various parts, and particularly in the connections between the control valve and the car body may be made without departing from the spirit of the invention.

What I claim is:

1. In an air brake, the combination with a constant capacity brake cylinder and means for supplying air under pressure thereto, of an expansion chamber connected to the brake cylinder and arranged to receive a portion of the air supplied for the brake cylinder, and a control valve in the connection between the brake cylinder and expansion chamber and arranged to place the expansion chamber in communication with the brake cylinder or to entirely cut the same off therefrom and in all positions maintaining the brake cylinder capacity constant.

2. In an air brake, the combination with a constant capacity brake cylinder and means for supplying air under pressure thereto, of an expansion chamber connected to the brake cylinder and arranged to receive a portion of the air supplied for the brake cylinder, and a control valve controlled by the load and controlling the connection between the expansion chamber and brake cylinder and arranged to place said expansion chamber in communication with said brake cylinder or entirely cut the same off therefrom and in all positions maintaining the brake cylinder capacity constant.

3. In an air brake, the combination of a train pipe, a triple valve, an auxiliary reservoir, a constant capacity brake cylinder, and connections between these parts, an expansion chamber connected to the brake cylinder, and a control valve in said connection arranged to place said expansion chamber in communication with the brake cylinder or entirely cut the same off therefrom and in all positions maintaining the brake cylinder capacity constant.

4. In an air brake, the combination of a train pipe, a triple valve, an auxiliary reservoir, a constant capacity brake cylinder, and connections between these parts, an expansion chamber connected to the brake cylinder, and a valve controlled by the load and controlling said connection and arranged to place said expansion chamber in communication with the brake cylinder or entirely cut the same off therefrom and in all positions maintaining the brake cylinder capacity constant.

5. In an air brake, the combination with brake applying means, means for supplying air under pressure thereto, an expansion chamber arranged to receive a portion of the air supplied for said brake applying means, and means for connecting said expansion chamber to and disconnecting the same from said brake applying means and so arranged that in no position does it affect the capacity of the brake applying means.

6. In an air brake, the combination with brake applying means, means for supplying air under pressure thereto, an expansion chamber arranged to receive a portion of the air supplied for said brake applying means, and means controlled by the load for connecting said expansion chamber to and disconnecting the same from said brake applying means and so arranged that in no position does it affect the capacity of the brake applying means.

7. In an air brake, the combination with a brake cylinder and means for supplying air under pressure thereto, of a divided expansion chamber having connection to the brake cylinder, and a control valve in said connection and arranged to place the brake cylinder in communication with one or more of said divisions.

8. In an air brake, the combination with a brake cylinder, and means for supplying air under pressure thereto, of a divided expansion chamber having connection to said brake cylinder, and a valve in said connection, said valve being controlled by the load in the car body and being so arranged that the brake cylinder is placed in communication with one or more of the divisions of the expansion chamber according to the load.

9. In an air brake, a brake cylinder large enough to fully brake a fully loaded car, a divided expansion chamber forming a dead space for air pressure, and means for placing one or more divisions of said expansion chamber in communication with the brake cylinder according to the load in the car to increase the volume into which the air normally supplied to the brake cylinder can expand and reduce the pressure in the brake cylinder when the car is not fully loaded.

J. RUSH SNYDER.

Witnesses:
W. W. MACFARREN,
ROSE NEVIN.